Figure 1:
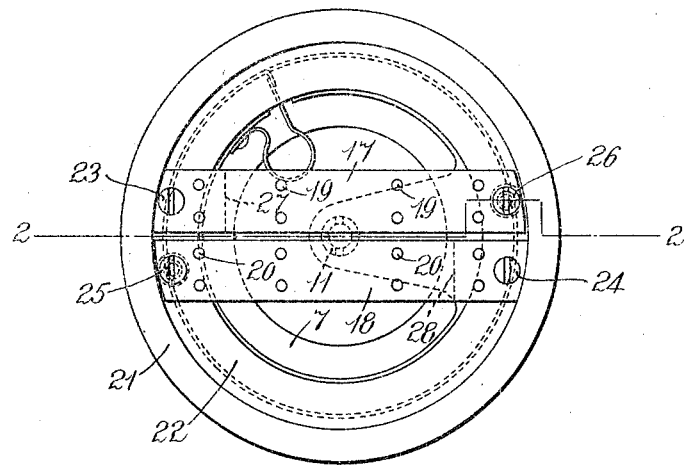

W. K. MENNS.
ELECTROMAGNETIC INSTRUMENT.
APPLICATION FILED MAR. 24, 1911.

1,029,880.  Patented June 18, 1912.

Witnesses.
Franklin E. Low.
Leonard A. Powell.

Inventor.
Walter K. Menns,
By his attorney,
Charles S. Gooding.

UNITED STATES PATENT OFFICE.

WALTER K. MENNS, OF MALDEN, MASSACHUSETTS, ASSIGNOR TO CHARLES H. PEARSON, OF BROOKLINE, MASSACHUSETTS.

ELECTROMAGNETIC INSTRUMENT.

1,029,880.

Specification of Letters Patent.　Patented June 18, 1912.

Application filed March 24, 1911. Serial No. 616,640.

*To all whom it may concern:*

Be it known that I, WALTER K. MENNS, a subject of King George V of England, residing at Malden, in the county of Middlesex and State of Massachusetts, have invented new and useful Improvements in Electromagnetic Instruments, of which the following is a specification.

This invention relates to improvements in electro-magnetic instruments such as tachometers, speed indicators and electricity meters and particularly to devices of this class in which the indicating element is moved by a disk of low electrical resistance placed within the field of a magnetic rotor which, when rotated, sets up lines of magnetic force flowing through the disk producing a braking effect which tends to rotate the disk with the rotor, there being provided a spring restraining the disk and acting to return it to its initial or zero position when the magnetic rotor ceases to rotate. The variable rotation of the magnetic rotor due to the variable speed of the machine to which it is connected to be driven acts to move the indicating element to varying position corresponding to the speed of the machine, there being provided a suitable graduated scale by means of which the speed may be read. Heretofore, such instruments have been found to be very seriously affected in their accuracy by variations in temperature. Heretofore, attempts have been made to overcome these inaccuracies, but thus far the means employed for compensating for the changes of temperature have thus proven to be inaccurate.

A characteristic of magnets is that the intensity of the magnetic field does not vary in direct proportion to the distance traveled toward or away from the magnet or, in other words, in moving an object in the magnetic field away from the magnet during the first thousandth of an inch of movement, the magnetic force does not decrease as much as it does during the second thousandth of an inch of movement. It has been found that thermostats employed for compensating for changes of temperature while they do correct the reading of the instrument to a certain extent yet if the influence of the thermostat is correct for normal and below normal temperatures its influence is too great for temperatures above normal and as a result the thermostat produces an over-correction so to speak. It has also been found that where the thermostat is of the bi-metallic type in which one of the metals is steel, the thermostat if placed within the magnetic field or if connected by a magnetic part to the field mass is influenced by the magnetism to such a marked degree as to render the thermostat so inaccurate and unreliable as to be practically inoperative for the purpose of compensating for changes of temperature.

The object of my invention is to provide a simple, inexpensive and reliable means for compensating for changes of temperature by changing the relative location of the rotating magnet and pivoted disk, or the relative location of the magnet and the field member, or the relative location of the magnet, the pivoted disk and the field member.

The object of my invention is to provide correcting the action of the thermostat or, in other words, causing the thermostat to exert a compensating influence upon the instrument in proportion as the intensity of the magnetic field diminishes as the disk or field ring or both disk and field ring approach or recede from the magnet, this object being attained preferably by providing means for resisting the movement of the thermostat in one direction from its normal position. In other words, this means prevents the thermostat from moving the disk and field mass too rapidly or too far toward the magnet as the temperature rises above normal.

To these ends, my invention consists in the novel features of construction and in the combination and arrangement of parts set forth in the following specification and particularly pointed out in the claims.

Figure 2:
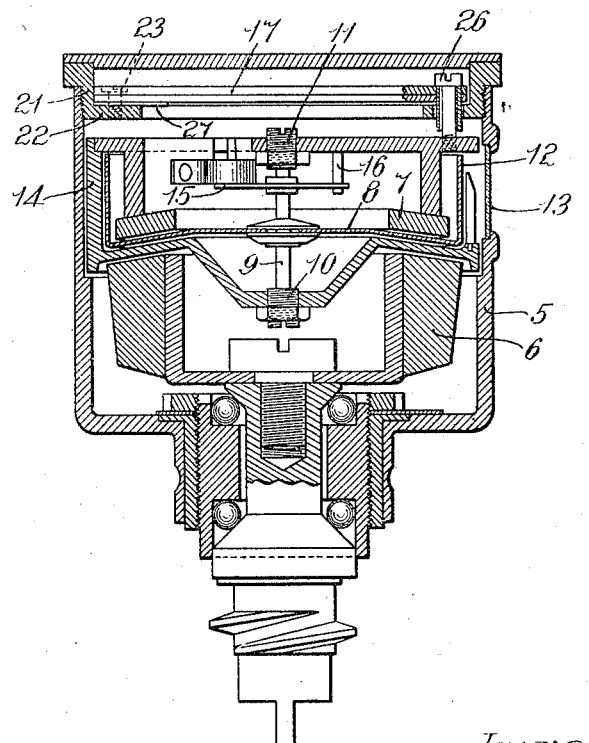

Referring to the drawings: Figure 1 is a plan of an electro-magnetic indicating instrument embodying my invention, the cover being removed. Fig. 2 is a sectional view taken on line 2—2 of Fig. 1.

Like numerals refer to like parts in both views of the drawing.

In the drawings, I have shown an electromagnetic speedometer or tachometer of the "Warner" type, although it will be clearly understood that my invention is applicable to any type of electro-magnetic instrument.

5 is the outer casing, 6 the magnetic rotor, 7 the field ring or field mass, and 8 is a member consisting of a disk of low electrical resistance interposed between the magnetic rotor and the field member and affixed to a shaft 9 pivoted in bearings 10 and 11 so as to swing freely on the same axis on which the rotor 6 rotates. This disk is provided with a vertical flange 12 which, in practice, will be provided with suitable numerals on its periphery in a well known manner, as shown in the patent to Warner, 823,237, dated June 12, 1906, which numerals are viewed through a glass window 13. The bearings 10 and 11 and the field ring 7 are mounted in an inner casing 14 which is of non-ferrous material. When the rotor 6 is rotated, it generates eddy currents in the disk 8, the reaction of these currents on the magnetic field of the rotor supplying a torque to the disk so that the magnetic pull thereon tends to rotate the disk with the rotor. The disk, however, is restrained by a suitable yielding means consisting of a hair spring 15 secured at its inner coil to the shaft 9 and at its outer end to a suitable fixed pin 16. This spring acts to keep the indicator steady at all speeds and return it to zero when the magnetic rotor stops. The field ring 7 serves to concentrate and conserve the magnetism, thereby insuring a more powerful pull on the pivoted disk 8.

Thus far, the construction and operation are well known to those skilled in this art. I will now proceed to describe the means whereby I am enabled to compensate for changes of temperature whereby the inaccuracies of the instrument owing to variations of temperature are obviated.

The casing 14 which contains the field ring 7 and the pivoted disk 8 is supported by one or more thermostats preferably of the bi-metallic laminated type and preferably two, as shown, which are designated by the numerals 17 and 18, each of these thermostats being preferably composed of two laminae, the upper lamina of each thermostat being formed of a material having a greater coefficient of expansion than the lower lamina. In practice, the best results have been secured with zinc for the upper lamina and steel for the lower lamina, the two strips of metal being secured together in any suitable manner as by means of rivets 19 and 20.

The thermostat 17 is supported at its left hand end upon a suitable fixed support as, for example, a ring 21 forming a part of the casing 5 and in like manner, the right hand end of the thermostat 18 is supported upon the opposite side of said ring. This ring is provided with an inwardly extending flange 22 to which the thermostats 17 and 18 are rigidly secured by means of screws 23 and 24, respectively. The other ends of the thermostats are unsupported and from these unsupported ends the casing 14 is suspended by suitable means such, for example, as screws 25 and 26 screwed into the casing 14. In this way, since the casing is supported at both sides, it will move in a direction parallel to the vertical axis thereof.

The laminae of the thermostats 17 and 18 are so proportioned that at a normal temperature, say 70° F., at which the instrument is graduated, the thermostats are straight and the readings of the instrument are made correct for all speeds and when the temperature varies above and below normal, the thermostats rise or fall, as the case may be, at their free ends, owing to the unequal expansion and contraction of the strips of metal composing each thermostat, thus raising or lowering the casing 14 together with the ring 7 and disk 8, it being understood that when the temperature falls below normal the casing is raised and when the temperature goes above normal the casing is lowered. As before stated, the intensity of the magnetic field does not vary in direct proportion to the distance traveled toward or away from the magnet. It follows that the compensating influence of the thermostats if correct for temperatures below 70° will be too great at temperatures above 70°, and that some means must be provided to cause the thermostats to move the pivoted disk exactly in proportion to the intensity of the magnetic field. I accomplish this preferably by providing means for imposing a restraint upon that movement of the thermostats during which the disk 8 and field ring 7 are carried toward the magnetic rotor 6, but preferably leaving the thermostat free as to upward movement, this result being arrived at in a very simple manner by arranging the support for each thermostat so that the distance from the free end thereof to its absolutely fixed point is greater than the distance from the free end to the extremity of the support. Thus it will be seen that the supporting flange 22 extends along the thermostat 18 beyond the screw 24, and, therefore, when the thermostat bends downwardly it is restrained to a certain extent by that portion of the flange 22 which is located between its edge and the point where the thermostat is secured to the flange by a screw, but when the thermostat rises it bends from the point where it is attached to the flange by its screw and the flange does not restrain the thermostat on its upward movement in the manner in which it is restrained in its downward movement. Moreover, I preferably provide an additional means consisting of elastic plates 27 and 28 interposed between the lower faces of the thermostats 17 and 18, respectively, and the upper face of the flange 22. These plates preferably are not absolutely unyielding, but, as before stated, are some-what resilient and their thickness and length are carefully proportioned so that they impose the proper degree of restraint upon the downward movement of the thermostats, or in other words, when the temperature rises above normal and the thermostats move downwardly to carry the disk and field ring toward the magnet, the thermostats are prevented from moving the disk and field mass too rapidly or too far toward the magnet as the temperature rises above normal.

Another important feature of my invention consists in the placing of the thermostats entirely outside of the influence of the magnet and the field mass so as to be entirely uninfluenced thereby, it being understood that the thermostats are composed partly of steel and if placed within the magnetic field would be influenced by the magnetism to such a marked degree as to render the thermostat so inaccurate and unreliable as to be practically inoperative.

Another important feature of my invention consists in moving not only the field ring 7 toward the magnetic rotor 6, but the disk 8 as well, as I have found by moving the disk a less amount of travel is required than where the ring alone is moved and by moving both the ring and disk a still less amount of travel is required, or, in other words, by moving the disk and the ring relative to the magnet the movement required is well within the capability of the thermostats.

Having thus described my invention, what I claim and desire by Letters Patent to secure is:

1. An electro-magnetic instrument having, in combination, means for producing a rotating magnetic field, a metal member mounted to oscillate in said field, a thermostat, means connecting said thermostat to said member, and means for restraining said thermostat in one direction of its operative movement.

2. An electro-magnetic instrument having, in combination, means for producing a rotating magnetic field, a metal member mounted to oscillate in said field, a thermostat, means connecting said thermostat to said member, and means to impose a restraint upon said thermostat in its operative movement in carrying said member toward the point of greatest intensity of said magnetic field.

3. An electro-magnetic instrument having, in combination, a rotatable magnet for producing a magnetic field, a metal member mounted to oscillate in said field, a laminated thermostat, means connecting said thermostat to said member, and means to support said thermostat, said means having provision for restraining said thermostat in its operative movement in carrying said member toward the point of greatest intensity of said magnetic field.

4. An electro-magnetic instrument having, in combination, a rotatable magnet for producing a magnetic field, a metal member mounted to oscillate in said field, a laminated thermostat, means connecting said thermostat to said member, and means engaging one face of said thermostat and restraining the same in its operative movement in one direction.

5. An electro-magnetic instrument having, in combination, a rotatable magnet for producing a magnetic field, a metal member mounted to oscillate in said field, a laminated thermostat connected to said member for changing the relative location of said member and said magnet to compensate for changes of temperature, means to hold one end of said thermostat in fixed position, said means engaging one face of said thermostat adjacent to said end for restraining said thermostat in its operative movement in one direction, and means forming an operative connection between the other end of said thermostat and said member.

6. An electro-magnetic instrument having, in combination, means for producing a magnetic field, a metal member mounted to oscillate in said field, a thermostat, means connecting said thermostat to said member, and means including an elastic device for yieldingly restraining said thermostat in one direction of its operative movement.

7. An electro-magnetic instrument having, in combination, means for producing a magnetic field, a metal member mounted to oscillate in said field, a thermostat, means connecting said thermostat to said member, and an elastic plate engaging one face of said thermostat and restraining the same in one direction of its operative movement.

8. An electro-magnetic instrument having, in combination, a field mass and a coöperating rotatable magnet for producing a magnetic field, a metal member mounted to oscillate in said field, thermostatic means, means connecting said thermostatic means to said member and to said field mass, and means for restraining said thermostat in one direction of its operative movement.

In testimony whereof I have hereunto set my hand in presence of two subscribing witnesses.

WALTER K. MENNS.

Witnesses:
 WALTER E. McGRAW,
 LOUIS A. JONES.